United States Patent
Ippatapu et al.

(10) Patent No.: US 11,487,726 B1
(45) Date of Patent: Nov. 1, 2022

(54) DYNAMIC DEDUPLICATION HASH TABLE MANAGEMENT

(71) Applicant: Dell Products, L.P., Hopkinton, MA (US)

(72) Inventors: Venkata Ippatapu, Westborough, MA (US); Jeremy O'Hare, Westborough, MA (US); Anoop Raghunathan, Ashland, MA (US)

(73) Assignee: Dell Products, L.P., Hopkinton, MA (US)

( * ) Notice: Subject to any disclaimer, the term of this patent is extended or adjusted under 35 U.S.C. 154(b) by 0 days.

(21) Appl. No.: 17/475,573

(22) Filed: Sep. 15, 2021

(51) Int. Cl.
| | |
|---|---|
| *G06F 16/00* | (2019.01) |
| *G06F 16/215* | (2019.01) |
| *G06F 16/22* | (2019.01) |
| *G06F 16/2455* | (2019.01) |
| *H04L 9/06* | (2006.01) |

(52) U.S. Cl.
CPC ........ *G06F 16/215* (2019.01); *G06F 16/2255* (2019.01); *G06F 16/24564* (2019.01); *H04L 9/0643* (2013.01)

(58) Field of Classification Search
CPC .............. G06F 16/215; G06F 16/2255; G06F 16/24564; H04L 9/0643
See application file for complete search history.

(56) References Cited

U.S. PATENT DOCUMENTS

| | | | | |
|---|---|---|---|---|
| 8,918,372 B1* | 12/2014 | Guo | ................... | G06F 16/137 |
| | | | | 707/747 |
| 9,639,274 B2* | 5/2017 | Maranna | ............... | G06F 3/0619 |
| 2013/0086006 A1* | 4/2013 | Colgrove | .............. | G06F 16/137 |
| | | | | 707/E17.005 |
| 2014/0032507 A1* | 1/2014 | Voigt | ..................... | G06F 3/067 |
| | | | | 707/E17.002 |
| 2019/0026042 A1* | 1/2019 | Gupta | ................... | G06F 3/0608 |
| 2020/0057586 A1* | 2/2020 | Inoue | .................... | G06F 3/0665 |
| 2021/0271650 A1* | 9/2021 | Wang | .................... | G06F 16/174 |

* cited by examiner

*Primary Examiner* — Diedra McQuitery
(74) *Attorney, Agent, or Firm* — Anderson Gorecki LLP

(57) ABSTRACT

A deduplication engine maintains a deduplication hash table containing a plurality of fingerprint entries identifying a track of current data and a hash value computed from the data currently stored at the identified track. A hash table manager implements a dynamic deduplication hash table management process, that includes a fingerprint entry purge process and a fingerprint entry re-entry process. The purge process is implemented on the deduplication hash table to remove selected fingerprint entries of tracks of data currently stored on the managed drives from the deduplication hash table based on a first set of Thin Device (TDev) selection rules and a second set of track selection purge rules. The re-entry process is implemented on the deduplication hash table to re-enter selected fingerprint entries into the deduplication hash table based on a third set of TDev selection rules and a fourth set of track selection re-entry rules.

18 Claims, 19 Drawing Sheets

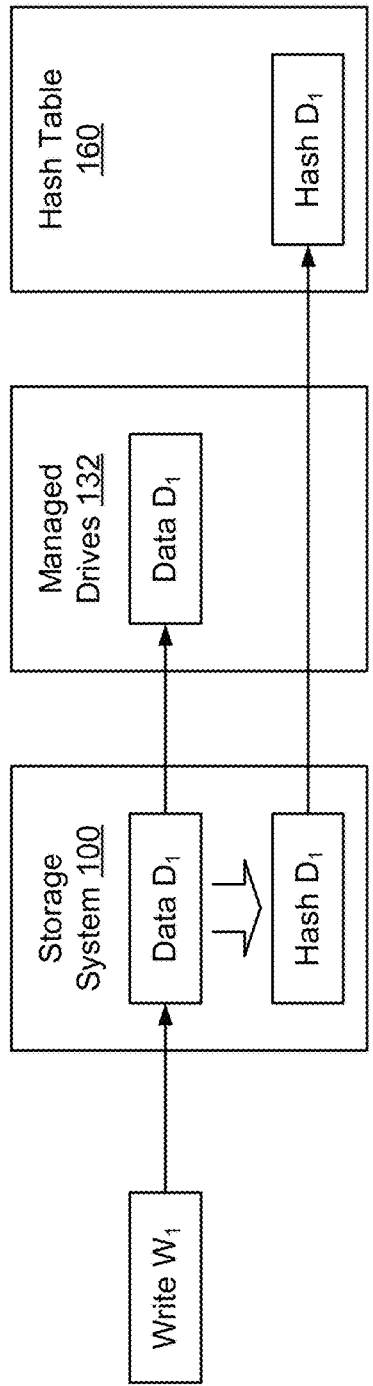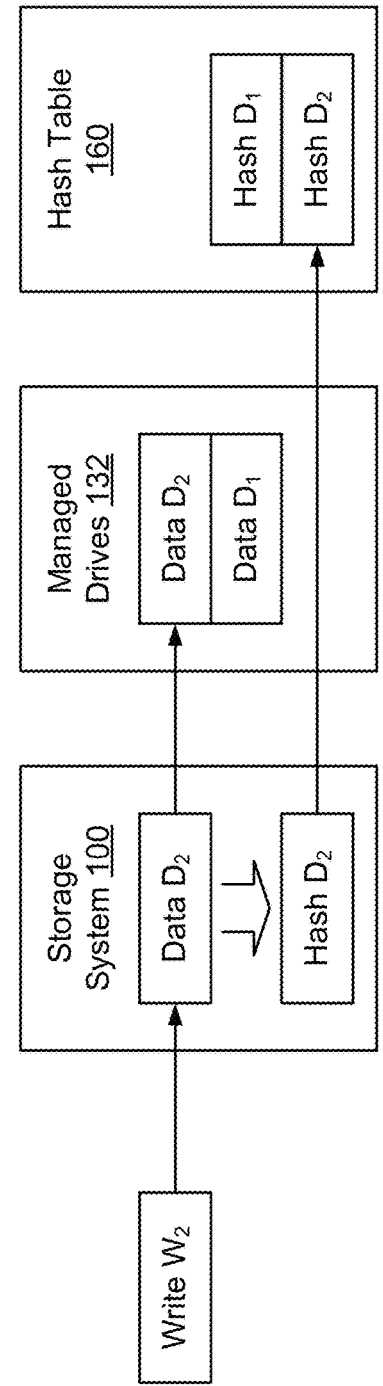

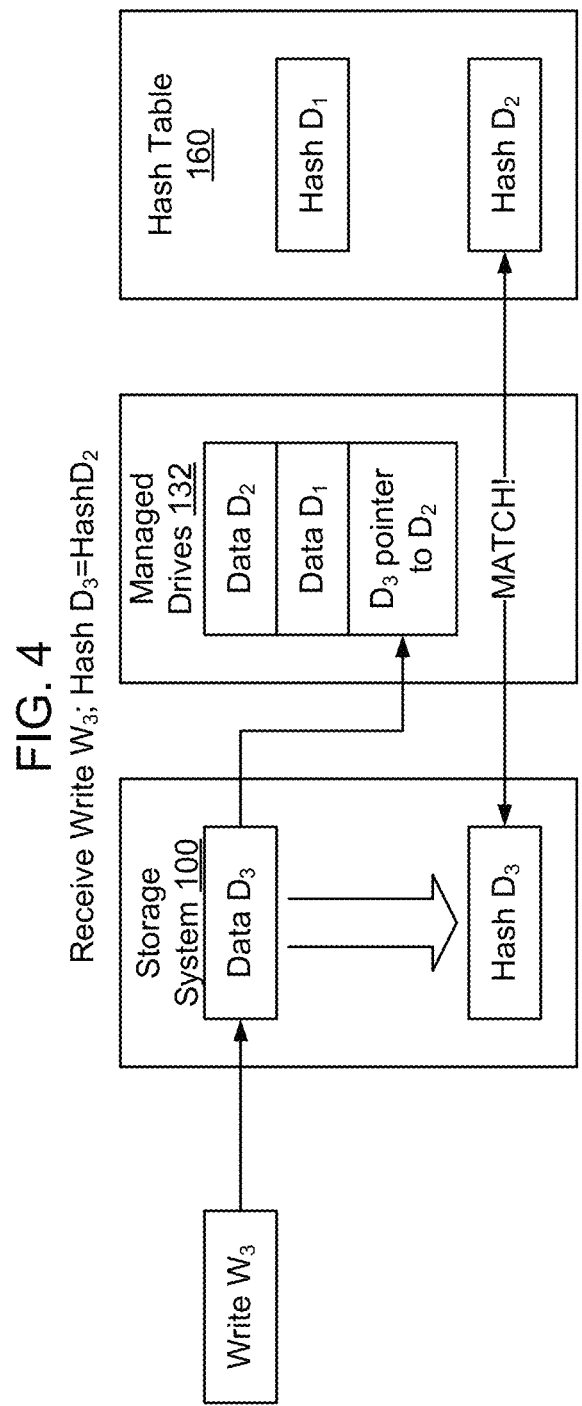

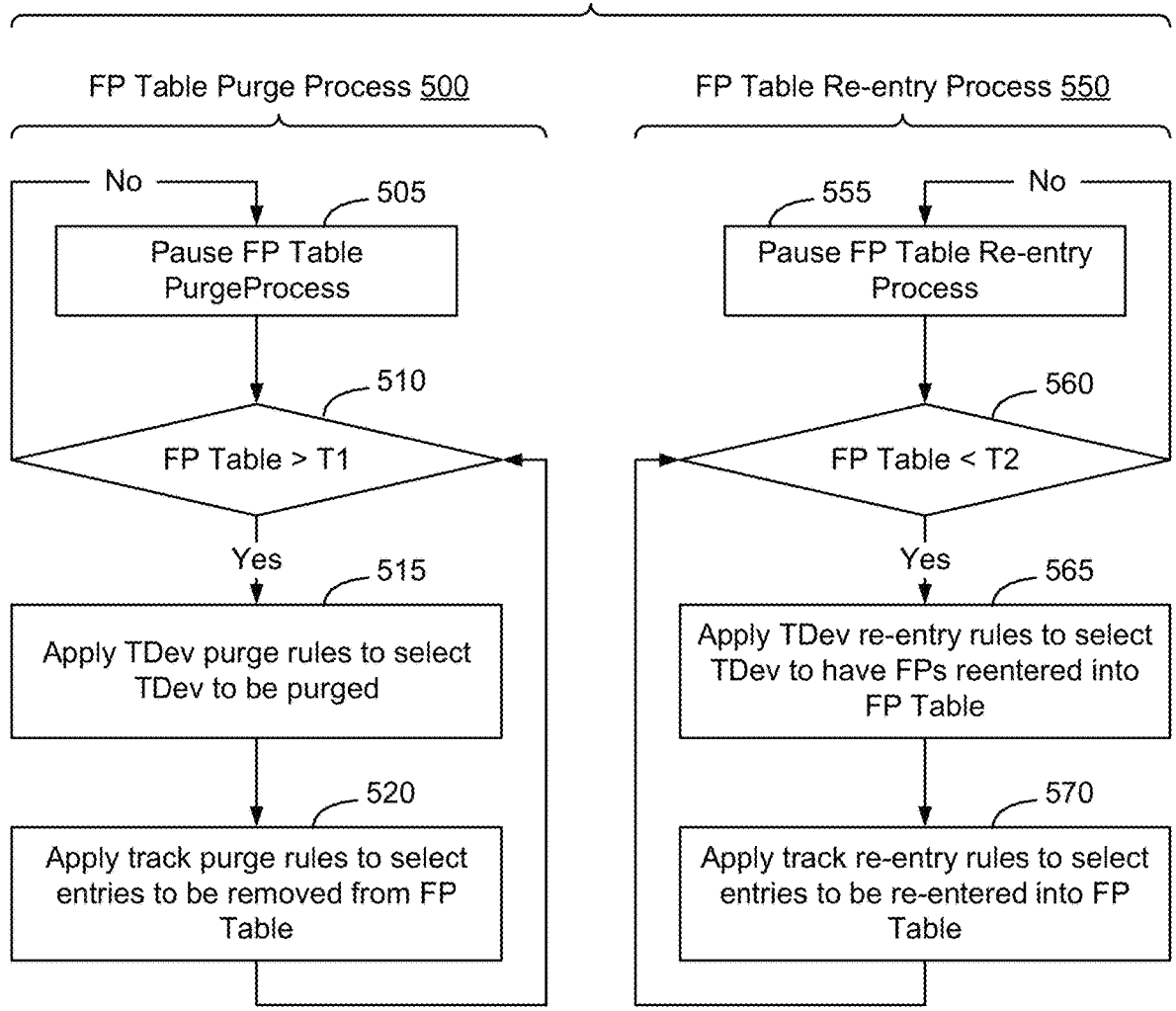

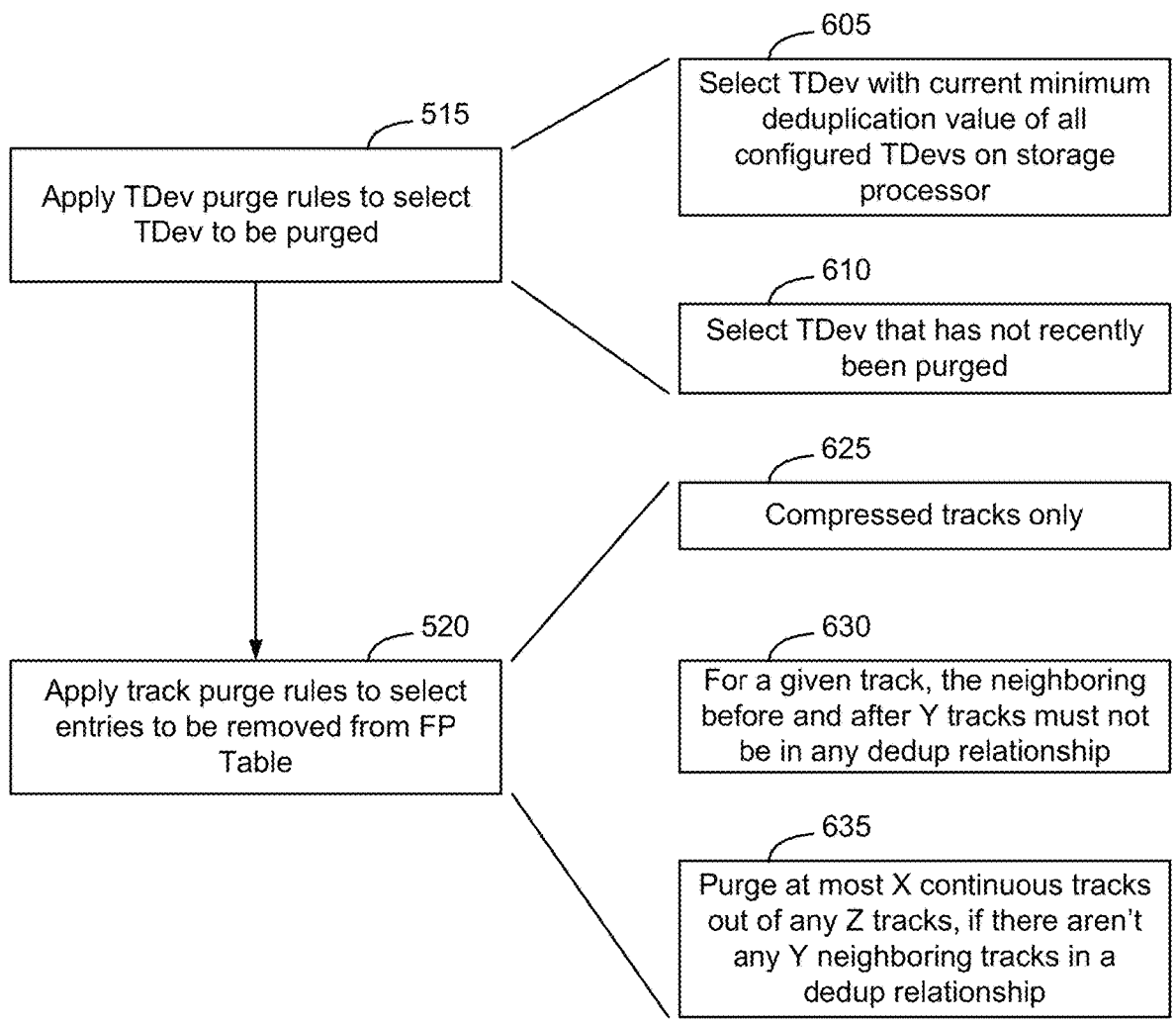

FIG. 7

| TDev | Dedup Rate | Purge State | Last Purge Date | Last Unpurged Date |
|---|---|---|---|---|
| 25 | 1.01 | PURGED | 3/20/2021 | 2/23/2021 |
| 8 | 1.11 | PURGED | 3/20/2021 | 2/26/2021 |
| 4 | 1.17 | PURGED | 3/6/2021 | 2/5/2021 |
| 9 | 1.20 | PURGED | 3/13/2021 | 2/19/2021 |
| 34 | 1.26 | PURGED | 3/11/2021 | 2/10/2021 |
| 28 | 1.32 | PURGED | 3/9/2021 | 2/13/2021 |
| 15 | 1.33 | PURGED | 3/12/2021 | 2/14/2021 |
| 21 | 1.34 | PURGED | 3/16/2021 | 2/18/2021 |
| 33 | 1.36 | PURGED | 3/21/2021 | 2/24/2021 |
| 6 | 1.00 | | 2/5/2021 | 3/7/2021 |
| 18 | 1.02 | | 2/25/2021 | 3/17/2021 |
| 10 | 1.06 | | 2/7/2021 | 3/1/2021 |
| 12 | 1.07 | | 1/27/2021 | 2/24/2021 |
| 30 | 1.08 | | 2/9/2021 | 3/9/2021 |
| 5 | 1.12 | | 2/9/2021 | 3/10/2021 |
| 31 | 1.14 | | 1/27/2021 | 2/24/2021 |
| 1 | 1.20 | | 2/25/2021 | 3/16/2021 |
| 2 | 1.22 | | 2/25/2021 | 3/16/2021 |
| 27 | 1.22 | | 2/5/2021 | 3/1/2021 |
| 32 | 1.22 | | 2/2/2021 | 3/4/2021 |
| 7 | 1.23 | | 2/8/2021 | 2/27/2021 |
| 23 | 1.24 | | 2/21/2021 | 3/18/2021 |
| 29 | 1.24 | | 2/17/2021 | 3/17/2021 |
| 17 | 1.25 | | 2/7/2021 | 3/1/2021 |
| 11 | 1.27 | | 2/20/2021 | 3/18/2021 |
| 3 | 1.30 | | 1/28/2021 | 2/26/2021 |
| 13 | 1.30 | | 2/13/2021 | 3/11/2021 |
| 16 | 1.30 | | 2/4/2021 | 3/3/2021 |
| 14 | 1.32 | | 1/28/2021 | 2/25/2021 |
| 22 | 1.32 | | 2/4/2021 | 3/3/2021 |
| 19 | 1.33 | | 2/4/2021 | 3/5/2021 |
| 26 | 1.36 | | 2/17/2021 | 3/15/2021 |

FIG. 8A – No dedup hits; No compression

| Track # | Dedup | Unallocated | Purge |
|---|---|---|---|
| 1 | | | Yes |
| 2 | | | Yes |
| 3 | | | Yes |
| 4 | | | Yes |
| 5 | | | Never |
| 6 | | | Yes |
| 7 | | | Yes |
| 8 | | | Yes |
| 9 | | | Yes |
| 10 | | | Never |
| 11 | | | Yes |
| 12 | | | Yes |
| 13 | | | Yes |
| 14 | | | Yes |
| 15 | | | Never |
| 16 | | | Yes |
| 17 | | | Yes |
| 18 | | | Yes |
| 19 | | | Yes |
| 20 | | X | Never |
| 21 | | | Yes |
| 22 | | | Yes |
| 23 | | | Yes |
| 24 | | | Yes |
| 25 | | | Never |
| 26 | | | Yes |
| 27 | | | Yes |
| 28 | | | Yes |
| 29 | | | Yes |
| 30 | | | Never |
| 31 | | | Yes |
| 32 | | | Yes |
| 33 | | | Yes |

FIG. 8B – FP Table after purge

| Track # | Dedup | Unallocated | Purge |
|---|---|---|---|
| 5 | | | Never |
| 10 | | | Never |
| 15 | | | Never |
| 25 | | | Never |
| 30 | | | Never |

FIG. 9A – dedup hits – no compression

| Track # | Dedup | Unallocated | Purge |
|---|---|---|---|
| 1 | X | | No |
| 2 | | | No |
| 3 | | | No |
| 4 | | | No |
| 5 | | | Never |
| 6 | X | | No |
| 7 | X | | No |
| 8 | | | No |
| 9 | | | No |
| 10 | | | Never |
| 11 | | | No |
| 12 | X | | No |
| 13 | | | No |
| 14 | | | No |
| 15 | | | Never |
| 16 | X | | No |
| 17 | | | No |
| 18 | | | No |
| 19 | | | No |
| 20 | | X | Never |
| 21 | | | No |
| 22 | | | No |
| 23 | X | | No |
| 24 | X | | No |
| 25 | | | Never |
| 26 | | | No |
| 27 | X | | No |
| 28 | | | No |
| 29 | | | No |
| 30 | | | Never |
| 31 | | | No |
| 32 | | | Yes |
| 33 | | | Yes |

FIG. 9B – FP Table after purge

| Track # | Dedup | Unallocated | Purge |
|---|---|---|---|
| 1 | X |  | No |
| 2 |  |  | No |
| 3 |  |  | No |
| 4 |  |  | No |
| 5 |  |  | Never |
| 6 | X |  | No |
| 7 | X |  | No |
| 8 |  |  | No |
| 9 |  |  | No |
| 10 |  |  | Never |
| 11 |  |  | No |
| 12 | X |  | No |
| 13 |  |  | No |
| 14 |  |  | No |
| 15 |  |  | Never |
| 16 | X |  | No |
| 17 |  |  | No |
| 18 |  |  | No |
| 19 |  |  | No |
| 21 |  |  | No |
| 22 |  |  | No |
| 23 | X |  | No |
| 24 | X |  | No |
| 25 |  |  | Never |
| 26 |  |  | No |
| 27 | X |  | No |
| 28 |  |  | No |
| 29 |  |  | No |
| 30 |  |  | Never |
| 31 |  |  | No |

FIG. 10A – dedup hits – no compression

| Track # | Dedup | Unallocated | Purge |
|---|---|---|---|
| 1 | X |  | No |
| 2 |  |  | No |
| 3 |  |  | No |
| 4 |  |  | No |
| 5 |  |  | Never |
| 6 | X |  | No |
| 7 | X |  | No |
| 8 |  |  | No |
| 9 |  |  | No |
| 10 |  |  | Never |
| 11 |  |  | No |
| 12 |  |  | Yes |
| 13 |  |  | Yes |
| 14 |  |  | Yes |
| 15 |  |  | Never |
| 16 |  |  | Yes |
| 17 |  |  | Yes |
| 18 |  |  | Yes |
| 19 |  |  | No |
| 20 |  | X | Never |
| 21 |  |  | No |
| 22 |  |  | No |
| 23 | X |  | No |
| 24 | X |  | No |
| 25 |  |  | Never |
| 26 |  |  | No |
| 27 | X |  | No |
| 28 |  |  | No |
| 29 |  |  | No |
| 30 |  |  | Never |
| 31 |  |  | No |
| 32 |  |  | Yes |
| 33 |  |  | Yes |

FIG. 10B – FP Table after purge

| Track # | Dedup | Unallocated | Purge |
|---|---|---|---|
| 1 | X |  | No |
| 2 |  |  | No |
| 3 |  |  | No |
| 4 |  |  | No |
| 5 |  |  | Never |
| 6 | X |  | No |
| 7 | X |  | No |
| 8 |  |  | No |
| 9 |  |  | No |
| 10 |  |  | Never |
| 11 |  |  | No |
| 15 |  |  | Never |
| 19 |  |  | No |
| 21 |  |  | No |
| 22 |  |  | No |
| 23 | X |  | No |
| 24 | X |  | No |
| 25 |  |  | Never |
| 26 |  |  | No |
| 27 | X |  | No |
| 28 |  |  | No |
| 29 |  |  | No |
| 30 |  |  | Never |
| 31 |  |  | No |

FIG. 11A – No dedup hits – compression

| Track # | Compressed | Dedup | Unallocated | Purge |
|---|---|---|---|---|
| 1 | X | | | Yes |
| 2 | X | | | Yes |
| 3 | | | | No |
| 4 | X | | | Yes |
| 5 | X | | | Never |
| 6 | | | | No |
| 7 | | | | No |
| 8 | X | | | Yes |
| 9 | X | | | Yes |
| 10 | X | | | Never |
| 11 | X | | | Yes |
| 12 | X | | | Yes |
| 13 | X | | | Yes |
| 14 | X | | | Yes |
| 15 | X | | | Never |
| 16 | | | | No |
| 17 | X | | | Yes |
| 18 | X | | | Yes |
| 19 | X | | | Yes |
| 20 | | | X | Never |
| 21 | X | | | Yes |
| 22 | X | | | Yes |
| 23 | X | | | Yes |
| 24 | | | | No |
| 25 | | | | Never |
| 26 | X | | | Yes |
| 27 | X | | | Yes |
| 28 | X | | | Yes |
| 29 | X | | | Yes |
| 30 | X | | | Never |
| 31 | X | | | Yes |
| 32 | X | | | Yes |
| 33 | X | | | Yes |

FIG. 11B – FP Table after purge

| Track # | Compressed | Dedup | Unallocated | Purge |
|---|---|---|---|---|
| 3 | | | | No |
| 5 | X | | | Never |
| 6 | | | | No |
| 7 | | | | No |
| 10 | X | | | Never |
| 15 | X | | | Never |
| 16 | | | | No |
| 24 | | | | No |
| 25 | | | | Never |
| 30 | X | | | Never |

FIG. 12A – Dedup hits – compression

| Track # | Compressed | Dedup | Unallocated | Purge |
|---|---|---|---|---|
| 1 | X | X | | No |
| 2 | X | | | No |
| 3 | | | | No |
| 4 | X | | | No |
| 5 | X | | | Never |
| 6 | | X | | No |
| 7 | | X | | No |
| 8 | X | | | No |
| 9 | X | | | No |
| 10 | X | | | Never |
| 11 | X | | | No |
| 12 | X | | | Yes |
| 13 | X | | | Yes |
| 14 | X | | | Yes |
| 15 | X | | | Never |
| 16 | | | | No |
| 17 | X | | | Yes |
| 18 | X | | | Yes |
| 19 | X | | | No |
| 20 | | | X | Never |
| 21 | X | | | No |
| 22 | X | | | No |
| 23 | X | X | | No |
| 24 | | X | | No |
| 25 | | | | Never |
| 26 | X | | | No |
| 27 | X | X | | No |
| 28 | X | | | No |
| 29 | X | | | No |
| 30 | X | | | Never |
| 31 | X | | | No |
| 32 | X | | | Yes |
| 33 | X | | | Yes |

FIG. 12B – FP Table after purge

| Track # | Compressed | Dedup | Unallocated | Purge |
|---|---|---|---|---|
| 1 | X | X | | No |
| 2 | X | | | No |
| 3 | | | | No |
| 4 | X | | | No |
| 5 | X | | | Never |
| 6 | | X | | No |
| 7 | | X | | No |
| 8 | X | | | No |
| 9 | X | | | No |
| 10 | X | | | Never |
| 11 | X | | | No |
| 15 | X | | | Never |
| 16 | | | | No |
| 19 | X | | | No |
| 21 | X | | | No |
| 22 | X | | | No |
| 23 | X | X | | No |
| 24 | | X | | No |
| 25 | | | | Never |
| 26 | X | | | No |
| 27 | X | X | | No |
| 28 | X | | | No |
| 29 | X | | | No |
| 30 | X | | | Never |
| 31 | X | | | No |

FIG. 13A – FP Table before restoration

| Track # | Compressed | Dedup | Unallocated | Purge |
|---|---|---|---|---|
| 3 | | | | No |
| 5 | X | | | Never |
| 6 | | | | No |
| 7 | | | | No |
| 10 | X | | | Never |
| 15 | X | | | Never |
| 16 | | | | No |
| 24 | | | | No |
| 25 | | | | Never |
| 30 | X | | | Never |

FIG. 13B – FP Table after restoration of TDev Entries

| Track # | Compressed | Dedup | Unallocated | Restored? |
|---|---|---|---|---|
| 1 | X | | | Restored |
| 2 | X | | | Restored |
| 3 | | | | Previous entry |
| 4 | X | | | Restored |
| 5 | X | | | Previous entry |
| 6 | | | | Previous entry |
| 7 | | | | Previous entry |
| 8 | X | | | Restored |
| 9 | X | | | Restored |
| 10 | X | | | Previous entry |
| 11 | X | | | Restored |
| 12 | X | | | Restored |
| 13 | X | | | Restored |
| 14 | X | | | Restored |
| 15 | X | | | Previous entry |
| 16 | | | | Previous entry |
| 17 | X | | | Restored |
| 18 | X | | | Restored |
| 19 | X | | | Restored |
| 21 | X | | | Restored |
| 22 | X | | | Restored |
| 23 | X | | | Restored |
| 24 | | | | Previous entry |
| 25 | | | | Previous entry |
| 26 | X | | | Restored |
| 27 | X | | | Restored |
| 28 | X | | | Restored |
| 29 | X | | | Restored |
| 30 | X | | | Previous entry |
| 31 | X | | | Restored |
| 32 | X | | | Restored |
| 33 | X | | | Restored |

DYNAMIC DEDUPLICATION HASH TABLE MANAGEMENT

FIELD

This disclosure relates to computing systems and related devices and methods, and, more particularly, to a method and apparatus for dynamic deduplication hash table management.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

A deduplication engine maintains a deduplication hash table containing a plurality of fingerprint entries identifying a track of current data and a hash value computed from the data currently stored at the identified track. A hash table manager implements a dynamic deduplication hash table management process, that includes a fingerprint entry purge process and a fingerprint entry re-entry process. The purge process is implemented on the deduplication hash table to remove selected fingerprint entries of tracks of data currently stored on the managed drives from the deduplication hash table based on a first set of Thin Device (TDev) selection rules and a second set of track selection purge rules. The re-entry process is implemented on the deduplication hash table to re-enter selected fingerprint entries into the deduplication hash table based on a third set of TDev selection rules and a fourth set of track selection re-entry rules.

BRIEF DESCRIPTION OF THE DRAWINGS

FIGS. 2-4 are functional block diagrams of an example method of implementing deduplication processing by a storage system, according to some embodiments.

FIG. 5 is a flow chart of an example method of dynamic deduplication hash table management, according to some embodiments.

FIG. 6 is a flow chart of an example method of dynamic deduplication hash table management, including a first set of rules for identify thin devices (TDev) that are candidates to have entries purged from a deduplication hash table, and a second set of rules for identifying tracks of the selected TDev that are candidates for removal from the deduplication hash table, according to some embodiments.

FIG. 7 is a functional block diagram of an example thin device data structure configured to identify thin devices (TDev) that are candidates to have entries purged from a deduplication hash table in connection with dynamic deduplication hash table management, according to some embodiments.

FIG. 8A is a functional block diagram of a portion of an example deduplication hash table data structure showing hash table entries of a selected TDev, prior to purging selected hash table entries from the portion of the example deduplication hash table data structure. In FIG. 8A, the deduplication hash table entries for the illustrated tracks are not in a deduplication relationship with any other volume of data, and whether an underlying track of data is compressed is not a consideration as to whether a deduplication hash table entry should be purged from the deduplication hash table.

FIG. 8B is a functional block diagram of the example portion of the deduplication hash table data structure of FIG. 8A after purging hash table entries in connection with dynamic deduplication hash table management, according to some embodiments.

FIG. 9A is a functional block diagram of a portion of an example deduplication hash table data structure showing hash table entries of a selected TDev, prior to purging selected hash table entries from the portion of the example deduplication hash table data structure. In FIG. 9A, several of the deduplication hash table entries for the illustrated tracks are in a deduplication relationship with other volumes of data. In FIG. 9A, whether the underlying track of data is compressed or not is not a consideration as to whether a deduplication hash table entry should be purged from the deduplication hash table.

FIG. 9B is a functional block diagram of the example portion of the deduplication hash table data structure of FIG. 9A after purging hash table entries in connection with dynamic deduplication hash table management, according to some embodiments.

FIG. 10A is a functional block diagram of another portion of an example deduplication hash table data structure showing hash table entries of a selected TDev, prior to purging selected hash table entries from the portion of the example deduplication hash table data structure. FIG. 10A is similar to FIG. 9A, except that different identified hash table entries are shown as being in a deduplication relationship with other volumes of data. In FIG. 10A, compression is not a consideration as to whether a deduplication hash table entry should be purged from the deduplication hash table.

FIG. 10B is a functional block diagram of the example portion of the deduplication hash table data structure of FIG. 10A after purging hash table entries in connection with dynamic deduplication hash table management, according to some embodiments.

FIG. 11A is a functional block diagram of another portion of an example deduplication hash table data structure showing hash table entries of a selected TDev, prior to purging selected hash table entries from the portion of the example deduplication hash table data structure. In FIG. 11A, only entries that are compressed are candidate deduplication hash table entries that may be purged from the deduplication hash table in connection with dynamic deduplication hash table management. In FIG. 11A, none of the shown deduplication hash table entries are in a deduplication relationship with another volumes of data.

FIG. 11B is a functional block diagram of the example portion of the deduplication hash table data structure of FIG. 11A after purging hash table entries in connection with dynamic deduplication hash table management, according to some embodiments.

FIG. 12A is a functional block diagram of another portion of an example deduplication hash table data structure showing hash table entries of a selected TDev, prior to purging selected hash table entries from the portion of the example deduplication hash table data structure. In FIG. 12A, only entries that are compressed are candidate deduplication hash table entries that may be purged from the deduplication hash table in connection with dynamic deduplication hash table management. In FIG. 12A, several of the deduplication hash table entries are in a deduplication relationship with another volumes of data.

FIG. 12B is a functional block diagram of the example portion of the deduplication hash table data structure of FIG. 12A after purging hash table entries in connection with dynamic deduplication hash table management, according to some embodiments.

FIG. 13A is a functional block diagram of another portion of an example deduplication hash table data structure showing hash table entries of a selected TDev, prior to purging selected hash table entries from the portion of the example deduplication hash table data structure, according to some embodiments.

FIG. 13B is a functional block diagram of the example portion of the deduplication hash table data structure of FIG. 13A after reentry of hash table entries to the deduplication hash table in connection with dynamic deduplication hash table management, according to some embodiments.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
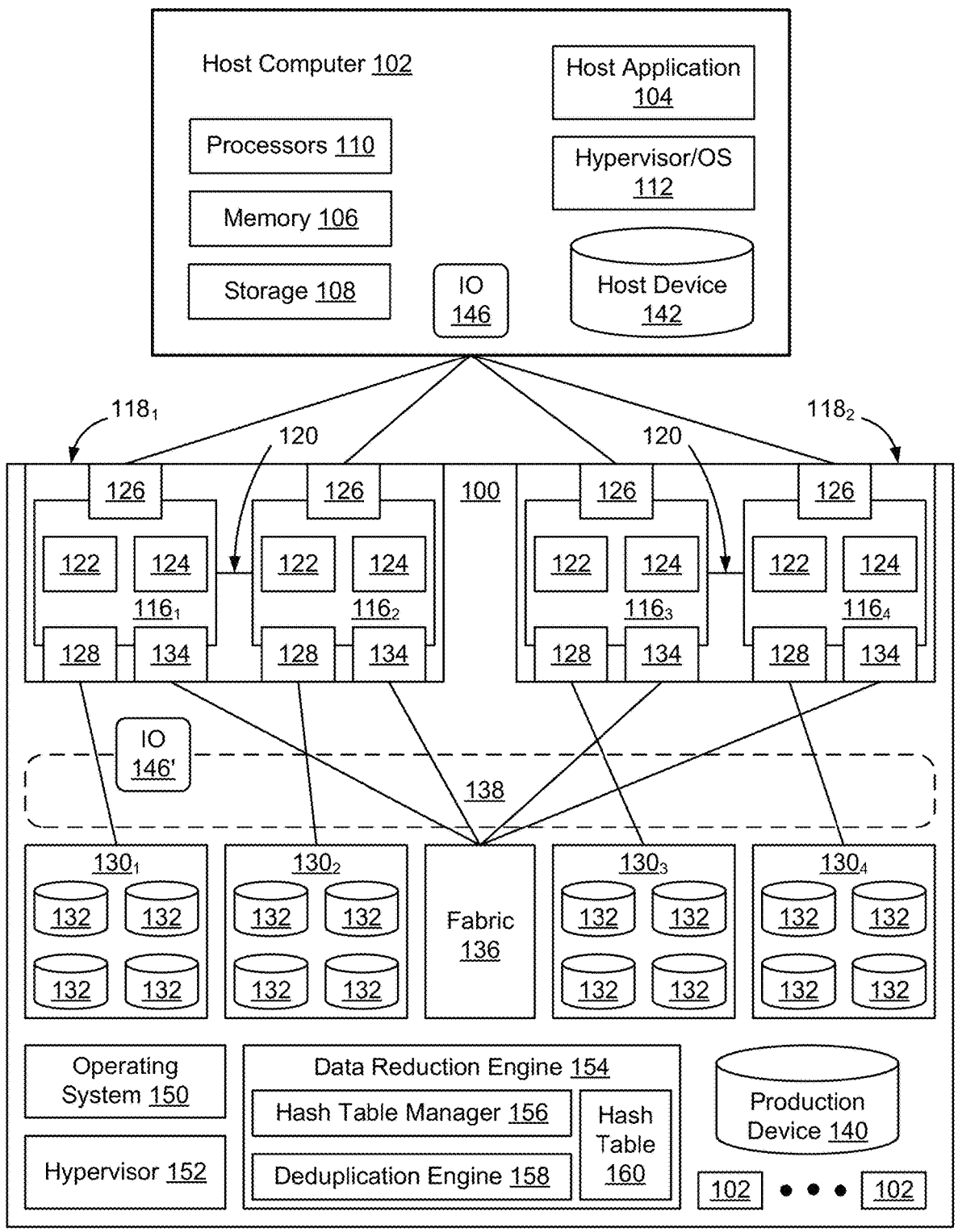
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g. including multiple CPUs, GPUs, and combinations thereof. The local volatile memory 124 may include, for example and without limitation, any type of RAM. Each compute node 116 may also include one or more front end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using InfiniBand. Each compute node 116 may allocate a portion or partition of its respective local volatile memory 124 to a virtual shared "global" memory 138 that can be accessed by other compute nodes 116, e.g. via DMA (Direct Memory Access) or RDMA (Remote Direct Memory Access). Shared global memory 138 will also be referred to herein as the cache of the storage system 100.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared global memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

There may be multiple paths between the host computer 102 and the storage system 100, e.g. one path per front end adapter 126. The paths may be selected based on a wide variety of techniques and algorithms including, for context and without limitation, performance and load balancing. In the case where IO 146 is a read command, the storage system 100 uses metadata to locate the commanded data, e.g. in the virtual shared global memory 138 or on managed drives 132. If the commanded data is not in the virtual shared global memory 138, then the data is temporarily copied into the virtual shared global memory 138 from the managed drives 132 and sent to the host application 104 by the front-end adapter 126 of one of the compute nodes $116_1$-$116_4$. In the case where the IO 146 is a write command, in some embodiments the storage system 100 copies a block being written into the virtual shared global memory 138, marks the data as dirty, and creates new metadata that maps the address of the data on the production device 140 to a location to which the block is written on the managed drives 132. The virtual shared global memory 138 may enable the production device 140 to be reachable via all of the compute nodes $116_1$-$116_4$ and paths, although the storage system 100 can be configured to limit use of certain paths to certain production devices 140.

Not all volumes of data on the storage system are accessible to host computer 104. When a volume of data is to be made available to the host computer, a logical storage volume, also referred to herein as a TDev (Thin Device), is linked to the volume of data, and presented to the host computer 104 as a host device 142. The host computer 102 can then execute read/write IOs on the TDev to access the data of the production device 140.

When a write IO is received by the storage system 100, in some embodiments the storage system will process the data contained in the write IO to determine if the data is already stored on managed drives 132. In some embodiments, this is implemented by a data reduction engine 154. As shown in FIG. 1, in some embodiments the data reduction engine includes a deduplication engine 158, a hash table management process 156, and a deduplication hash table 160. The data reduction engine 154 may contain additional components, such as a compression engine (not shown) depending on the embodiment. In some embodiments, the deduplication engine performs deduplication processing on the write request, to determine whether the write IO contains data that has already been written to the storage resources of the storage system. To do this, the deduplication engine 158 compares a fingerprint of the write IO to fingerprints of previous write IOs on the TDev associated with the write IO. An example process implemented by the deduplication engine is shown in FIGS. 2-4. The hash table manager 156, in some embodiments, implements a dynamic deduplication hash table management process to dynamically purge and reenter fingerprint entries to the hash table 160, as discussed in greater detail herein in connection with FIGS. 5-14.

FIGS. 2-4 are functional block diagrams of an example method of implementing deduplication processing by deduplication engine 158 of a storage system 100, according to some embodiments.

FIG. 2 shows an example in which the storage system receives a write $W_1$ containing data $D_1$. When the write $W_1$ is received, the deduplication engine 158 creates a fingerprint (Hash $D_1$) of the data $D_1$, for example using hash generator, and compares the fingerprint (Hash $D_1$) with fingerprints of other tracks of data of the TDev stored on managed drives 132. In FIG. 2 it is assumed that the data $D_1$ does not previously exist on managed drives 132 and, accordingly, data $D_1$ is stored on managed drives 132 and the fingerprint (Hash $D_1$) of data $D_1$ is stored in hash table 160.

In some embodiments the deduplication engine includes a hash generator configured to generate fingerprints of data using a cryptographic hash algorithm, such as SHA-256 hash algorithm, configured to generate a 32-byte (256 bit) hash value for every 32 KB block of data. Another Secure Hash Algorithm (SHA) configured to output a different length digest, such as a 224, 384, or 512-bit digest may also be used depending on the implementation. Likewise, other cryptographic hash algorithms or other algorithms designed to deterministically generate fingerprints of data received by the storage system 100 may also be used depending on the embodiment. For ease of explanation the data fingerprints are also synonymously referred to herein as "hash" values.

As shown in FIG. 3, every time data is received by the storage system, a hash of the received data is generated and compared against all other hash values for that TDev in the hash table 160. In FIG. 3, when a write on the same TDev containing data $D_2$ is received, the deduplication engine 158 creates hash $D_2$ and compares hash $D_2$ against all the other hash values for that TDev in hash table 160. In this simple example, the deduplication hash table 160 only previously contained the Hash $D_1$ for the particular TDev and, since hash $D_2$ does not equal hash $D_1$ in this example, the deduplication engine knows that the data $D_2$ is not currently stored on managed drives 132. Accordingly, the data $D_2$ is stored in managed drives 132 and hash $D_2$ is stored in the hash table 160.

FIG. 4 shows another scenario in which a write $W_3$ is received on the particular TDev containing data $D_3$. As shown in FIG. 4, the deduplication engine creates a hash $D_3$ and compares hash $D_3$ with all other hash values in the hash table 160 for that TDev. In this instance, hash $D_3$ matches hash $D_2$, which indicates that it is possible that data $D_3$ matches data $D_2$. However, although it is unlikely, there is a possibility that two different pieces of data may generate the same hash value. Accordingly, to ensure that data $D_3$ is the same as data $D_2$, in some embodiments a byte-to-byte comparison is implemented to verify that data $D_3$ matches data $D_2$. If the two volumes of data match, rather than storing identical copies of data in managed drives 132, the deduplication engine instead causes a pointer to data $D_2$ to be stored in metadata. Although the pointer is shown on managed drives 132 (for ease of illustration), in some embodiments the pointer resides in metadata tables that are stored in global memory 138.

There are instances when a storage system will be presented with the same data multiple times in rapid succession. For example, if an email is sent to a large number of employees, the email server may try to store multiple copies of the same email on the storage system 100. Rather than having the storage system 100 write multiple copies of the same email to its back-end storage resources 130, the data storage system may be configured to save one copy of the email and save pointers in metadata for each of the other copies. This is data efficient, in that it can dramatically reduce the amount of required back-end storage resources.

However, not every track of data is written multiple times to the storage system. To enable the storage system to determine which tracks of data are likely duplicates, it is possible to create a database of unique ids for each possible match in the system which could be duplicated. These unique IDs are often Secure Hash Algorithm (SHA) hashes, and the entry usually requires some related data such as where to find the corresponding data in the managed resources of the storage system. Accordingly, it is not unusual for each deduplication hash table fingerprint (FP) entry to require 16-64 bytes of storage, for every potential deduplication match. Regardless of where the deduplication hash table is stored—in memory or on disk—the amount of memory used to implement the deduplication hash table can become considerable, particularly in a large storage system with millions of tracks of data.

From research activities and observed systems, it was determined that deduplication tends to be biased toward some thin devices (TDev) and away from others. Specifically, some TDevs tend to achieve more data reduction from deduplication, whereas other TDevs tend to not achieve significant data reduction from deduplication. Additionally, it was found that the majority of deduplication savings occurred in sequences of 1 MB or more. Specifically, although storage systems often implement deduplication using 8 KB tracks, the amount of deduplication savings associated with implementing deduplication of a single 8 KB track is much less than implementing deduplication on a larger block of data. Further, applicant discerned that deduplication hash tables typically only reach their maximum size in situations where there is very poor deduplication.

According to some embodiments, a method of implementing dynamic deduplication hash table management is based on the realization that customer volumes which have poor deduplication can be adequately represented in the deduplication hash table by sample entries every 512 KB to 1 MB, rather than having an entry for every 8 KB track of current data stored in the managed resources of the storage system. This results in significant savings in the number of entries in the deduplication hash table. By implementing a first set of rules to select TDevs to have entries purged from the deduplication hash table, and implementing a second set of rules to specify which fingerprint entries for current tracks of data should be purged from the deduplication hash table, it is possible to dynamically and intelligently optimize the deduplication hash table by retaining the appropriate fingerprint entries only, thereby reducing the need for excessive DRAM resource allocation and mitigating the cost of storage systems by using available resources to as great extent as possible.

FIG. 5 is a flow chart of an example method of dynamic deduplication hash table management, according to some embodiments. As shown in FIG. 5, in some embodiments the dynamic deduplication hash table management process is implemented using two parallel processes: a first process 500 configured to purge fingerprint (FP) entries from the deduplication hash table; and a second process 550 configured to restore fingerprint (FP) entries to the deduplication hash table. In some embodiments, the purge process 500 and re-entry process 550 are implemented using independently executing processes which might execute simultaneously or consecutively, depending on the implementation. For example, in some embodiments, the fingerprint table purge process can be executing to purge FP entries of a given TDev from the deduplication hash table while, at the same time, the fingerprint table reentry process 550 may be re-entering FP entries of another TDev back into the deduplication hash table.

As shown in FIG. 5, in some embodiments the purge process 500 is a background process that executes periodically whenever the size of the deduplication hash table exceeds a first threshold T1. For example, as shown in FIG. 5, the purge process 500 is paused (block 505) and a determination is made as to whether the size of the deduplication hash table is larger than the threshold T1. An example threshold might be, for example, 90% of a maximum size, although other thresholds might be used depending on the particular implementation. The deduplication hash table is also referred to herein as a "fingerprint" or "FP" table.

If the size of the deduplication hash table is not above the threshold T1 (a determination of NO at block 510), the purge process 500 continues to pause. If the deduplication hash table is above the threshold T1 (a determination of YES at block 510), the purge process resumes execution and applies a first set of TDev selection purge rules to select a TDev to be purged (block 515). Although the deduplication hash table might contain entries from multiple TDevs, in some embodiments deduplication is implemented by the storage system only within individual TDevs. Specifically, the deduplication engine 158 will only implement deduplication within a TDev and will not implement deduplication across TDevs. Accordingly, when purging entries from the deduplication hash table, in some embodiments the purge process 500 first selects a TDev, and then once the TDev is selected, the purge process will apply a second set of track selection purge rules to select particular FP entries associated with the TDev to be removed from the deduplication hash table (block 520). It should be noted that the selected FP entries that are to be removed from the deduplication hash table during block 520 are fingerprint entries associated with data that is currently stored on the managed storage resources of the storage system 100. While that data will remain stored on the managed storage resources, the deduplication hash table will not contain fingerprint entries for some of that data, which enables the size of the deduplication hash table to be reduced in size such that less storage resources are required to be used to store the deduplication hash table.

As shown in FIG. 5, the dynamic deduplication hash table management process also has a re-entry process 550 configured to add FP entries back into the deduplication hash table. In some embodiments the re-entry process 550 is a background process that executes periodically whenever the size of the deduplication hash table falls below a second threshold T2. For example, as shown in FIG. 5, the reentry process 550 is paused (block 555) and a determination is made as to whether the size of the deduplication hash table is smaller than the threshold T2 (block 560). An example threshold might be, for example, 92% of a maximum size, although other thresholds might be used depending on the particular implementation.

Accordingly, reentry process 550 monitors the size of the deduplication hash table and pauses while the size of the deduplication hash table is above the threshold T2 (block 555). Periodically, the re-entry process 550 determines whether the size of the deduplication hash table is smaller than the second threshold T2 (block 560). As noted above, when the purge process 500 is executing, FP entries are purged (removed) from the deduplication hash table. Thus, execution of the purge process tends to reduce the size of the deduplication hash table. If the deduplication hash table is reduced in size sufficiently to fall below the second threshold T2 (a determination of YES at block 560), the re-entry process executes to select a TDev that should have FP entries re-inserted in the deduplication hash table. In some embodiments, the re-entry process 550 applies a set of TDev re-entry selection rules to select a TDev to have FP entries re-entered into the deduplication hash table (block 565). An example set of TDev re-entry selection rules might be, for example, to preferentially select a TDev that has waited the longest since it was in the unpurged state. Once a TDev has been selected, the re-entry process 550 applies a set of track selection re-entry rules to select entries to be re-entered into the deduplication hash table (block 570).

In some embodiments, thin devices (TDevs) that are purged are re-evaluated periodically and are re-entered back to the deduplication hash table when the dedup ratio for the TDev has increased. For example, if a TDev that is currently in the purged state has an increased dedup ratio, the tracks of that TDev that have been purged from the deduplication hash table may be restored to the deduplication hash table. Likewise, the amount of time that the TDev has been in the purged state may be used to select a TDev to be re-entered, such that when the current purged TDev age is greater than "X" days/months, the TDev and its tracks that were originally purged are re-entered back to the deduplication hash table to ensure purged TDevs get some unpurged time in the deduplication hash table.

As shown in FIG. 5, in some embodiments the purge process 500 and re-entry process 550 may execute simultaneously. The particular manner in which the processes 500, 550 operate may be controlled by adjusting the thresholds T1, T2, to ensure that the size of the deduplication hash table is maintained within a target size range by causing the purge process 500 and re-entry process 550 to balance, thus preventing the overall size of the deduplication hash table from exceeding its maximum size allocation.

FIG. 6 is a flow chart of an example method of dynamic deduplication hash table management, including a first set of rules for identify thin devices (TDev) that are candidates to have entries purged from a deduplication hash table, and a second set of rules for identifying tracks of the selected TDev that are candidates for removal from the deduplication hash table, according to some embodiments. In particular, as shown in FIG. 6, in some embodiments the dynamic deduplication hash process applies a first set of TDev selection purge rules to select a TDev to be purged (block 515). In some embodiments, the criteria used to select a particular TDev to have entries purged from the deduplication hash table include selecting a TDev with the current minimum deduplication value of all configured TDevs on the storage processor (block 605), and selecting a TDev that has not recently been purged (block 610).

In some embodiments, the purge process 500 evaluates the amount of deduplication savings achieved on each of the TDevs configured on the storage system. Deduplication tends to be biased toward some volumes (TDevs) and away from other TDevs, such that some TDevs are able to achieve significant deduplication storage savings while other TDevs achieve little storage savings from deduplication. A TDev with current minimum deduplication allocations (or) savings is a device that has minimum dedup hits and is therefore an appropriate candidate to purge FP entries from the deduplication hash table. By preferentially selecting TDevs that exhibit the minimum deduplication savings, it is possible to preferentially purge entries from the deduplication hash table that are unlikely to be used in a deduplication relationship. Accordingly, in some embodiments, the deduplication engine uses the following rule when evaluating TDevs in connection with selecting a TDev to be purged from the deduplication hash table:

TDEV_to_purge=Min_dedup(TDEV1,TDEV2, TDEV3, . . . ,TDEV*n*)

In addition, to ensure fairness across all TDevs, and prevent purging the same TDev again and again, in some embodiments the purge process 500 also preferentially selects a TDev to be purged when the last unpurged date is greater than X days/months. Accordingly, a TDev that wasn't purged at all in a given number of previous cycles may be given preference to purge in the current purge cycle, to ensure fairness across all TDevs.

Once a TDev has been selected, the purge process applies track selection purge rules to select FP entries associated with data that is currently stored in managed storage resources of the storage system to be removed from the deduplication hash table (block 520). In some embodiments, the selection track purge rules include removing fingerprint entries only if the underlying tracks of data are compressed (block 625). In some embodiments, when a track of data is compressed, a SHA hash of the original data is created and stored along with the compressed track. By deleting only fingerprint entries of only compressed tracks, if a FP entry is subsequently selected by the re-entry process 550 to be added back into the deduplication hash table, it is possible to simply read the hash from the compressed track such that a new hash of the data stored at that track is not required to be generated. Further, compressed tracks are slightly less likely to dedup, and since compressed tracks are smaller in size, deduplication of a compressed track results in less savings than deduplication of an uncompressed track.

In some embodiments, the track purge rules include a rule that, for a given track, Y neighboring tracks (both before and after) must not be in any deduplication relationship (block 630). As noted above, in some embodiments a majority of deduplication savings occurs in large blocks of data, for example in chunks of data having a size of 512K–1M+. If the Y neighboring tracks (before and after the selected track) are not in a deduplication relationship, it is unlikely that the current track that is being evaluated will result in a deduplication relationship, and even more unlikely that the current track will be part of a larger chunk of dedup data.

In some embodiments, the track purge rules also include a rule that at most X continuous tracks will be purged, out of any Z number of tracks, if there aren't any Z tracks that are in a deduplication relationship. For example, if X=4 and Z=5, the purge process 500 will purge at most 4 consecutive tracks out of every 5 tracks, thus ensuring that every 5th track of the TDev will not be purged from the deduplication hash table. In some embodiments, it is possible to set Y=Z, such that Y of block 630=Z of block 635.

FIG. 7 is a functional block diagram of an example thin device (TDev) data structure configured to identify thin devices (TDev) that are candidates to have entries purged from a deduplication hash table in connection with dynamic deduplication hash table management, according to some embodiments. As shown in FIG. 7, in some embodiments the thin device (TDev) data structure contains multiple TDev state entries—one TDev state entry for each TDev configured on the storage system. Each TDev state entry contains a deduplication rate (DedupRate) identifying an amount of deduplication savings associated with deduplication of entries of the TDev. A lower deduplication rate indicates that there is less savings associated with implementing deduplication processing on the TDev. Accordingly, since there is less savings associated with implementing deduplication processing on a TDev with a lower DedupRate, it is preferential to purge FP entries associated with TDevs with lower deduplication rates.

Each TDev state entry of the thin device TDev data structure also includes an indication of the current purged/non purged state of the TDev, the date the TDev was last purged, and the date the TDev was last in the unpurged state. As noted above, in some embodiments the purge process 500 uses the last purged date to preferentially select TDevs that have not recently been purged, and the re-entry process 550 uses the last unpurged date as one of the criteria for selection of a TDev to have FP entries re-entered into the deduplication hash table.

FIGS. 8A-8B, 9A-9B, 10A-10B, 11A-11B, and 12A-12B provide some examples to illustrate application of the track selection rules (blocks 625, 630, 635) by the purge process 500. In FIGS. 8A-8B, 9A-9B, and 10A-10B, it is assumed that none of the tracks are compressed and, accordingly, the rule (block 625) that only fingerprint entries associated with compressed tracks are candidates for removal from the deduplication hash table is not applicable to these figures. The use of the compression rule (block 625) is shown in connection with FIGS. 11A-11B, and 12A-12B.

FIG. 8A is a functional block diagram of a portion of an example deduplication hash table data structure showing hash table entries of a selected TDev, prior to purging selected hash table entries from the portion of the example deduplication hash table data structure. In FIG. 8A, none of the deduplication hash table entries for the illustrated tracks are in a deduplication relationship with any other volume of data, and whether a track is compressed is not a consideration as to whether a deduplication hash table entry should be purged from the deduplication hash table. As shown in FIG. 8A, track #20 is unallocated, which means that there is no data stored at track #20. Since there is no data at track #20, there is no FP entry for that track. Track #20 has been shown in FIG. 8A for completeness.

In the example shown in FIGS. 8A-8B, it is assumed that Y=Z=5 and X=4—Namely that a FP entry will be removed from the deduplication hash table if there is no track within Y=5 tracks (before or after) that is in a deduplication relationship, and that at most X=4 tracks out of every Z=5 tracks will be removed from the deduplication hash table. Accordingly, as shown in FIG. 8A, every fifth track (Y=5) will never be removed from the deduplication hash table. However, since none of the tracks are in a deduplication relationship, each of the FP entries associated with the other tracks are able to be purged from the deduplication hash table. The FP entries that are able to be removed from the deduplication hash table are shown in gray in FIG. 8A.

FIG. 8B is a functional block diagram of the example portion of the deduplication hash table data structure of FIG. 8A after purging hash table entries in connection with dynamic deduplication hash table management, according to some embodiments. As shown in FIG. 8B, after purging entries from the deduplication hash table, the deduplication hash table only includes a FP entry for tracks 5, 10, 15, 25, and 30 (note—track #20 is not shown in FIG. 8B because it is unallocated).

FIG. 9A is a functional block diagram of a portion of an example deduplication hash table data structure showing hash table entries of a selected TDev, prior to purging selected hash table entries from the portion of the example deduplication hash table data structure. In FIG. 9A, several of the deduplication hash table entries for the illustrated tracks are in a deduplication relationship with other volumes of data. In FIG. 9A, compression is not a consideration as to whether a deduplication hash table entry should be purged from the deduplication hash table. In the example shown in FIGS. 9A-9B, it is assumed that Y=Z=5 and X=4—Namely that a FP entry will be removed from the deduplication hash table only if there is no track within Y=5 tracks (before or after) that is in a deduplication relationship, and that at most X=4 tracks out of every Z=5 tracks will be removed from the deduplication hash table. Accordingly, as shown in FIG. 9A, every fifth track (Z=5) will never be removed from the deduplication hash table.

As shown in FIG. 9A, tracks 2-5, 8-11, 13-15, 17-22, 25-26, and 28-32 are all tracks that are not in any deduplication relationship and, hence, are candidates to have FP entries removed from the deduplication hash table. However, applying the Y=5 rule, it is clear that only tracks 31 and 32 are 5 or more tracks away from another track that is in a deduplication relationship. Accordingly, only tracks 31 and 32 have FP entries in the deduplication hash table that are able to be removed. These entries are shown in gray in FIG. 9A.

FIG. 9B is a functional block diagram of the example portion of the deduplication hash table data structure of FIG. 9A after purging hash table entries in connection with dynamic deduplication hash table management, according to some embodiments. As shown in FIG. 9B, after purging, FP entries for tracks 31 and 32 have been removed from the deduplication hash table (note—track #20 is not shown in FIG. 9B because it is unallocated).

FIG. 10A is a functional block diagram of another portion of an example deduplication hash table data structure showing hash table entries of a selected TDev, prior to purging selected hash table entries from the portion of the example deduplication hash table data structure. FIG. 10A is similar to FIG. 9A, except that different identified hash table entries are shown as being in a deduplication relationship with other volumes of data. In FIG. 10A, compression of the underlying tracks of data is not a consideration as to whether a deduplication hash table entry should be purged from the deduplication hash table. In the example shown in FIGS. 10A-10B, it is assumed that Y=Z=5 and X=4—Namely that a FP entry will be removed from the deduplication hash table if there is no track within Y=5 tracks (before or after) that is in a deduplication relationship, and that at most X=4 tracks out of every Z=5 tracks will be removed from the deduplication hash table. Accordingly, as shown in FIG. 10A, every fifth track (Z=5) will never be removed from the deduplication hash table.

As shown in FIG. 10A, tracks 2-5, 8-22, 25-26, and 28-32 are all tracks that are not in any deduplication relationship and, hence, are candidates to have FP entries removed from the deduplication hash table. Applying the Y=5 rule, such that a FP entry will not be removed if any track within 5 tracks before or after is in a deduplication ratio, it is clear that only tracks 12-18 and 31 and 32 are 5 or more tracks away from another track that is in a deduplication relationship. Further, applying the rule that at most 4 out of every consecutive 5 tracks will be removed from the deduplication hash table, the selected tracks to have FP entries purged from the deduplication hash table is reduced to tracks 12-14, 16-18, and 31-32. These entries are shown in gray in FIG. 10A.

FIG. 10B is a functional block diagram of the example portion of the deduplication hash table data structure of FIG. 10A after purging hash table entries in connection with dynamic deduplication hash table management, according to some embodiments. As shown in FIG. 10B, after purging, the deduplication hash table does not include FP entries for tracks 12-14, 16-18, and 31-32, thus reducing the amount of storage used to implement the deduplication hash table in connection with storing FP entries for this particular TDev (note—track #20 is not shown in FIG. 10B because it is unallocated).

FIG. 11A is a functional block diagram of another portion of an example deduplication hash table data structure showing hash table entries of a selected TDev, prior to purging selected hash table entries from the portion of the example deduplication hash table data structure. In FIG. 11A, only fingerprint entries that are associated with compressed tracks of data are candidate deduplication hash table entries that may be purged from the deduplication hash table in connection with dynamic deduplication hash table management (see FIG. 6, block 625). In FIG. 11A, none of the shown deduplication hash table entries are in a deduplication relationship with another volumes of data.

As shown in FIG. 11A, applying the rule that at most X=4 out of Z=5 tracks will have FP entries purged from the deduplication hash table results in tracks 5, 10, 15, 20, 25, and 30 never being candidates for removal from the deduplication hash table, regardless of compressed/uncompressed status. Since there are no deduplication relationships identified in FIG. 11A, all of the other tracks have FP entries that are candidates for removal from the deduplication hash table. However, applying the rule (block 625) that only FP entries associated with compressed tracks will be removed from the deduplication hash table results in tracks 1-2, 4, 8-9, 11-14, 17-19, 21-23, 26-29, and 31-33 being purged from the deduplication hash table (since these tracks are identified in FIG. 11A as compressed). These entries are shown in gray in FIG. 11A.

FIG. 11B is a functional block diagram of the example portion of the deduplication hash table data structure of FIG. 11A after purging hash table entries in connection with dynamic deduplication hash table management, according to some embodiments. As shown in FIG. 11B, after purging, the deduplication hash table does not include FP entries for tracks 1-2, 4, 8-9, 11-14, 17-19, 21-23, 26-29, and 31-33, thus reducing the amount of storage used to implement the deduplication hash table in connection with storing FP entries for this particular TDev (note—track #20 is not shown in FIG. 11B because it is unallocated).

FIG. 12A is a functional block diagram of another portion of an example deduplication hash table data structure showing hash table entries of a selected TDev, prior to purging selected hash table entries from the portion of the example deduplication hash table data structure. In FIG. 12A, only fingerprint entries that are associated with compressed tracks of data are candidate deduplication hash table entries that may be purged from the deduplication hash table in connection with dynamic deduplication hash table management. In FIG. 12A, several of the deduplication hash table entries are in a deduplication relationship with another volumes of data.

Applying the Y=5 rule, such that a FP entry will not be removed if any track within 5 tracks before or after is in a deduplication relationship, it is clear that only tracks 12-18 and 31 and 32 are 5 or more tracks away from another track that is in a deduplication relationship. Further, applying the rule that at most 4 out of every consecutive 5 fingerprint entries will be removed from the deduplication hash table, the candidate tracks to have FP entries purged from the deduplication hash table is reduced to tracks 12-14, 16-18, and 31-32. Since track 16 is not compressed, the fingerprint entry for track 16 is retained in the deduplication hash table, such that during the purge process fingerprint entries for tracks 12-14, 17-18, and 31-32 will be removed from the deduplication hash table. These entries are shown in gray in FIG. 12A.

FIG. 12B is a functional block diagram of the example portion of the deduplication hash table data structure of FIG. 12A after purging hash table entries in connection with dynamic deduplication hash table management, according to some embodiments. As shown in FIG. 12B, after purging, the deduplication hash table does not include FP entries for tracks 112-14, 17-18, and 31-32, thus reducing the amount of storage used to implement the deduplication hash table in connection with storing FP entries for this particular TDev.

FIG. 13A is a functional block diagram of a portion of an example deduplication hash table data structure showing hash table entries of a selected TDev, prior to purging selected hash table entries from the portion of the example deduplication hash table data structure, according to some embodiments. In the example shown in FIG. 13A, it is assumed that the portion of the deduplication hash table for the TDev is in a purged state, such that selected FP entries for the TDev have previously been removed from the deduplication hash table.

During a re-entry process, in some embodiments all FP entries for allocated tracks of a given TDev are re-inserted into the deduplication hash table. For example, FIG. 13B is a functional block diagram of the example portion of the deduplication hash table data structure of FIG. 13A after reentry of hash table entries to the deduplication hash table in connection with dynamic deduplication hash table management, according to some embodiments. As shown in FIG. 13B, during the re-entry process FP entries for tracks 1-2, 4, 8-9, 11-14, 17-19, 21-23, 26-29, and 31-33 are added back to the deduplication hash table. Note that no entry for track 20 has been included, as it is assumed in this example that track 20 is unallocated and, hence, there is no FP entry for track 20.

Figure 14:
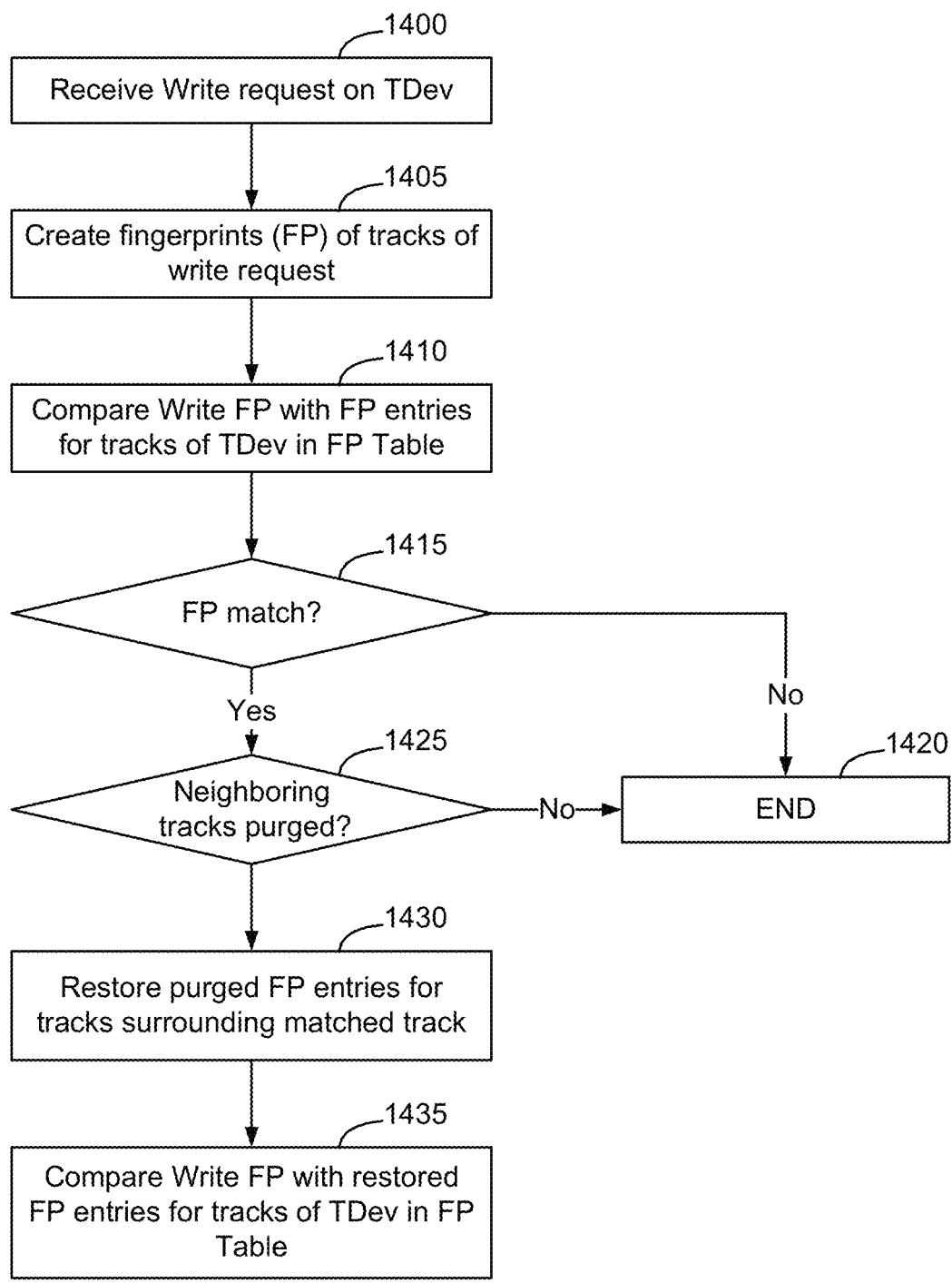
FIG. 14 is a flow chart of an example method of processing a write request using a dynamically managed deduplication hash table, according to some embodiments.

FIG. 14 is a flow chart of an example method of processing a write request on a purged TDev using a dynamically managed deduplication hash table, according to some embodiments. As shown in FIG. 14, if the deduplication hash table for a particular TDev is in a purged state, the deduplication hash table may not contain FP entries for each track of the TDev. In some embodiments, when a write is received (block 1400) fingerprints of the tracks associated with the write request are created (block 1405). The write fingerprints are then compared with fingerprint entries for tracks of the TDev in the deduplication hash table (block 1410) to determine if there is a match between any of the fingerprints of the write data and any of the fingerprints in the deduplication hash table (block 1415).

If there is no match (a determination of NO at block 1415), the process ends. If at least one of the fingerprints of the write data matches one of the fingerprints in the deduplication hash table (a determination of YES at block 1415), a determination is made as to whether any of the neighboring tracks of the TDev have been purged from the deduplication hash table (block 1425).

If none of the neighboring tracks have been purged from the deduplication hash table (a determination of NO at block 1420), the process ends. If one or more of the neighboring tracks has been purged from the deduplication hash table (a determination of YES at block 1425), in some embodiments the purged neighboring tracks are re-entered into the deduplication hash table (block 1430), and fingerprints of the write data are compared with the restored fingerprint entries (block 1435). By proactively restoring the previously purged FP entries, it is possible to selectively populate a portion of the deduplication hash table fingerprint entries that are possibly relevant to the most recently received write IO, without requiring the deduplication hash table to continuously store every FP entry for a given TDev, thus considerably reducing the amount of storage resources required to implement the deduplication hash table.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A non-transitory tangible computer readable storage medium having stored thereon a computer program for dynamic deduplication hash table management, the computer program including a set of instructions which, when executed by a computer, cause the computer to perform a method comprising the steps of:
    maintaining a deduplication hash table containing a plurality of fingerprint entries, each fingerprint entry identifying a track of data currently stored on managed drives and containing a hash value computed from the track of data currently stored on the managed drives at the identified track;
    implementing a purge process on the deduplication hash table to remove selected fingerprint entries of tracks of data currently stored on the managed drives from the deduplication hash table based on a first set of Thin Device (TDev) selection rules and a second set of track selection purge rules;
    implementing a re-entry process on the deduplication hash table to re-enter selected fingerprint entries into the deduplication hash table based on a third set of TDev selection rules and a fourth set of track selection re-entry rules.

2. The non-transitory tangible computer readable storage medium of claim 1, wherein the first set of TDev selection rules comprises preferentially selecting TDevs with low deduplication ratios.

3. The non-transitory tangible computer readable storage medium of claim 1, wherein the first set of TDev selection rules comprises preferentially selecting TDevs that have been in an unpurged state for a longest amount of time.

4. The non-transitory tangible computer readable storage medium of claim 1, wherein the second set of track selection purge rules comprises selecting fingerprint entries of tracks to be purged only where the fingerprint entries are based on tracks of data currently stored on the managed drives that are in a compressed state.

5. The non-transitory tangible computer readable storage medium of claim 1, wherein the second set of track selection purge rules comprises selecting fingerprint entries of tracks to be purged only where, for a given fingerprint entry, a neighboring before and after "Y" number of tracks are not in a deduplication relationship.

6. The non-transitory tangible computer readable storage medium of claim 5, wherein the second set of track selection purge rules comprises selecting X continuous out of every Y fingerprint entries, if there aren't any neighboring Y tracks that are in a deduplication relationship.

7. The non-transitory tangible computer readable storage medium of claim 1, wherein the third set of TDev selection rules comprises preferentially selecting TDevs with higher deduplication ratios to have fingerprint entries of tracks of data currently stored on the managed drives to be re-entered into the deduplication hash table.

8. The non-transitory tangible computer readable storage medium of claim 1, wherein the third set of TDev selection rules comprises preferentially selecting TDevs that have been in a purged state for a longest amount of time.

9. The non-transitory tangible computer readable storage medium of claim 1, wherein the fourth set of track selection re-entry rules comprises selecting every previously purged fingerprint entry for all tracks of data currently stored on the managed drives.

10. A method of dynamic deduplication hash table management, comprising:
 maintaining a deduplication hash table containing a plurality of fingerprint entries, each fingerprint entry identifying a track of data currently stored on managed drives and containing a hash value computed from the track of data currently stored on the managed drives at the identified track;
 implementing a purge process on the deduplication hash table to remove selected fingerprint entries of tracks of data currently stored on the managed drives from the deduplication hash table based on a first set of Thin Device (TDev) selection rules and a second set of track selection purge rules;
 implementing a re-entry process on the deduplication hash table to re-enter selected fingerprint entries into the deduplication hash table based on a third set of TDev selection rules and a fourth set of track selection re-entry rules.

11. The method of claim 10, wherein the first set of TDev selection rules comprises preferentially selecting TDevs with low deduplication ratios.

12. The method of claim 10, wherein the first set of TDev selection rules comprises preferentially selecting TDevs that have been in an unpurged state for a longest amount of time.

13. The method of claim 10, wherein the second set of track selection purge rules comprises selecting fingerprint entries of tracks to be purged only where the fingerprint entries are based on tracks of data currently stored on the managed drives that are in a compressed state.

14. The method of claim 10, wherein the second set of track selection purge rules comprises selecting fingerprint entries of tracks to be purged only where, for a given fingerprint entry, a neighboring before and after "Y" number of tracks are not in a deduplication relationship.

15. The method of claim 14, wherein the second set of track selection purge rules comprises selecting X continuous out of every Y fingerprint entries, if there aren't any neighboring Y tracks that are in a deduplication relationship.

16. The method of claim 10, wherein the third set of TDev selection rules comprises preferentially selecting TDevs with higher deduplication ratios to have fingerprint entries of tracks of data currently stored on the managed drives to be re-entered into the deduplication hash table.

17. The method of claim 10, wherein the third set of TDev selection rules comprises preferentially selecting TDevs that have been in a purged state for a longest amount of time.

18. The method of claim 10, wherein the fourth set of track selection re-entry rules comprises selecting every previously purged fingerprint entry for all tracks of data currently stored on the managed drives.

\* \* \* \* \*